Feb. 24, 1970 M. E. GERARD 3,497,665
APPLY TYPE ELECTRON BEAM WELDING APPARATUS
Filed Dec. 29, 1966 7 Sheets-Sheet 2

INVENTOR.
M. E. GERARD
BY
George E. Pearson
ATTORNEY

INVENTOR.
M. E. GERARD
BY George E. Pearson
ATTORNEY

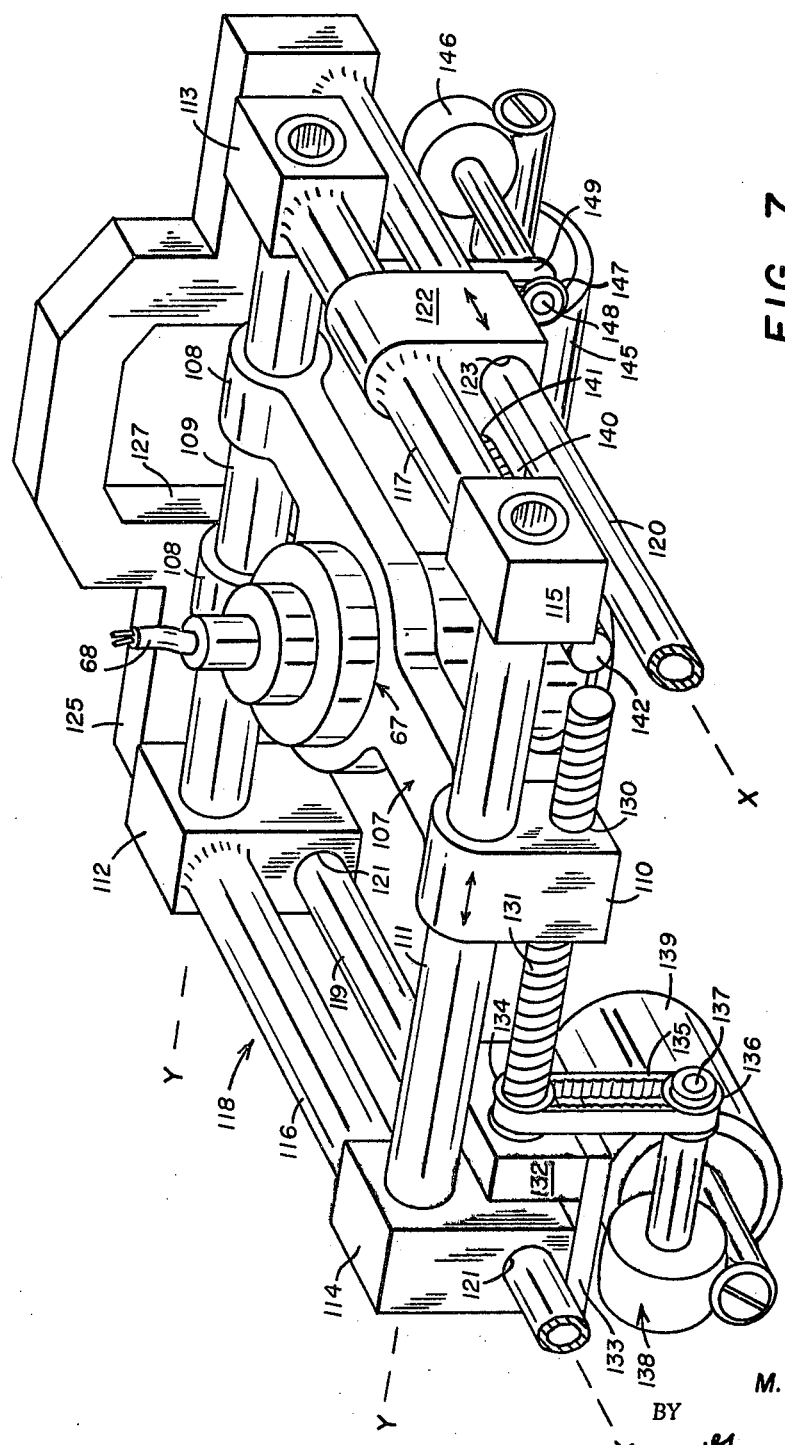

United States Patent Office 3,497,665
Patented Feb. 24, 1970

3,497,665
APPLY TYPE ELECTRON BEAM WELDING APPARATUS
Milan E. Gerard, Chula Vista, Calif., assignor to Rohr Corporation, Chula Vista, Calif., a corporation of California
Filed Dec. 29, 1966, Ser. No. 605,852
Int. Cl. B23k 15/00
U.S. Cl. 219—121       4 Claims

ABSTRACT OF THE DISCLOSURE

A split apply type vacuum chamber has observation ports and provision for the electron beam welding of a multi-T-section workpiece too large to be contained in its entirety within the chamber. The split chamber has separable chambers which mutually engage to separately enclose each of the discrete joints of the workpiece. The periphery of the engaging chambers has sealed notches which respectively engage and enclose the T-section members forming the discrete joint to be welded. A first one of the separable chambers is fixed around the joint and the other is movable into sealing engagement with the first to enclose the joint. Diffusion pumps connected to the split chamber are interconnected by a manifold which is flexibly connected to a roughing and backing pump. An electron beam gun is mounted within the movable chamber for engagement of its beam with the enclosed joint of the workpiece and for movement thereon along X, Y and Z axes.

BACKGROUND OF THE INVENTION

This invention relates generally to the art of electron beam welding and more particularly to improvements in apply type electron beam welding apparatus for separately welding discrete joints in a workpiece too large to be contained in its entirety within a vacuum chamber required for the welding operation.

SUMMARY OF THE INVENTION

In accordance with the present invention, a small split vacuum chamber is provided having a relatively separable upper and lower, or front and back chambers, as the case may be, which are assembled about the workpiece joint, or joints, to be welded within the combined chamber thus formed. The various welding areas or zones of the workpiece, and the parts adjoining thereat, are successively disposed substantially within one of the chambers, in sealed engagement therewith, and the other of the chambers, which carries the electron beam gun and connections to the electrical power, is then moved into peripherally sealing engagement with said one of the chambers. A vacuum is then drawn in the resulting combined chamber, using for the purpose, a pumping system including a roughing pump which eventually is supplemented by at least one diffusion pump, at which time, the roughing pump continues operation as a backing pump. In the preferred arrangement, a pheripheral array of diffusion pumps carried directly by the movable one of the separable chambers operates into a manifold which has a flexible line connection with the roughing and backing pump.

The movable one of the chambers has X—X and Y—Y axis movements for the electron beam gun carried thereby, these movements being sufficient to provide for alignment and welding traverse of the electron beam with respect to the workpiece joint, or joints, to be welded in each of the welding zones of the workpiece. In this arrangement, at least one of the separable chambers has a port for viewing these beam aligning and welding operations.

OBJECTS OF THE INVENTION

An object of the present invention is to provide a new and improved type of electron beam welding apparatus which may be operated to perform welding operations in discrete welding areas or zones of a workpiece and which, for the purpose, may be either fixed or portable.

Another object is to provide an apply type electron beam welding apparatus for separately welding the several jointed crossover welding areas or zones in a cruciform type of framework.

Another object is to provide a separable back and front chamber unit which may be assembled about each cruciform zone of the framework to enclose the same thereat, and to make provision for moving the front chamber, together with its electron gun and electrical and vacuum pumping connections, into sealing engagement with the back chamber after the same has been assembled about and sealed to the workpiece in each of said cruciform welding zones thereof.

Another object resides in the provision of X and Y axis movements of the electron beam gun to provide for alignment and welding traverse of the beam with respect to each joint to be welded in each of the welding zones.

Still another object is to make provision for viewing the beam aligning and welding traverse operations occurring within the apply chamber.

Still other objects, features and advantages of the present invention will become more fully apparent as the description proceeds, reference being had to the accompanying drawings wherein:

BRIEF DESCRIPTION OF THE DRAWINGS

FIG. 7 is a perspective view of X and Y axis movements employed in the split chamber of FIG. 2.

SPECIFICATION

Figure 1:
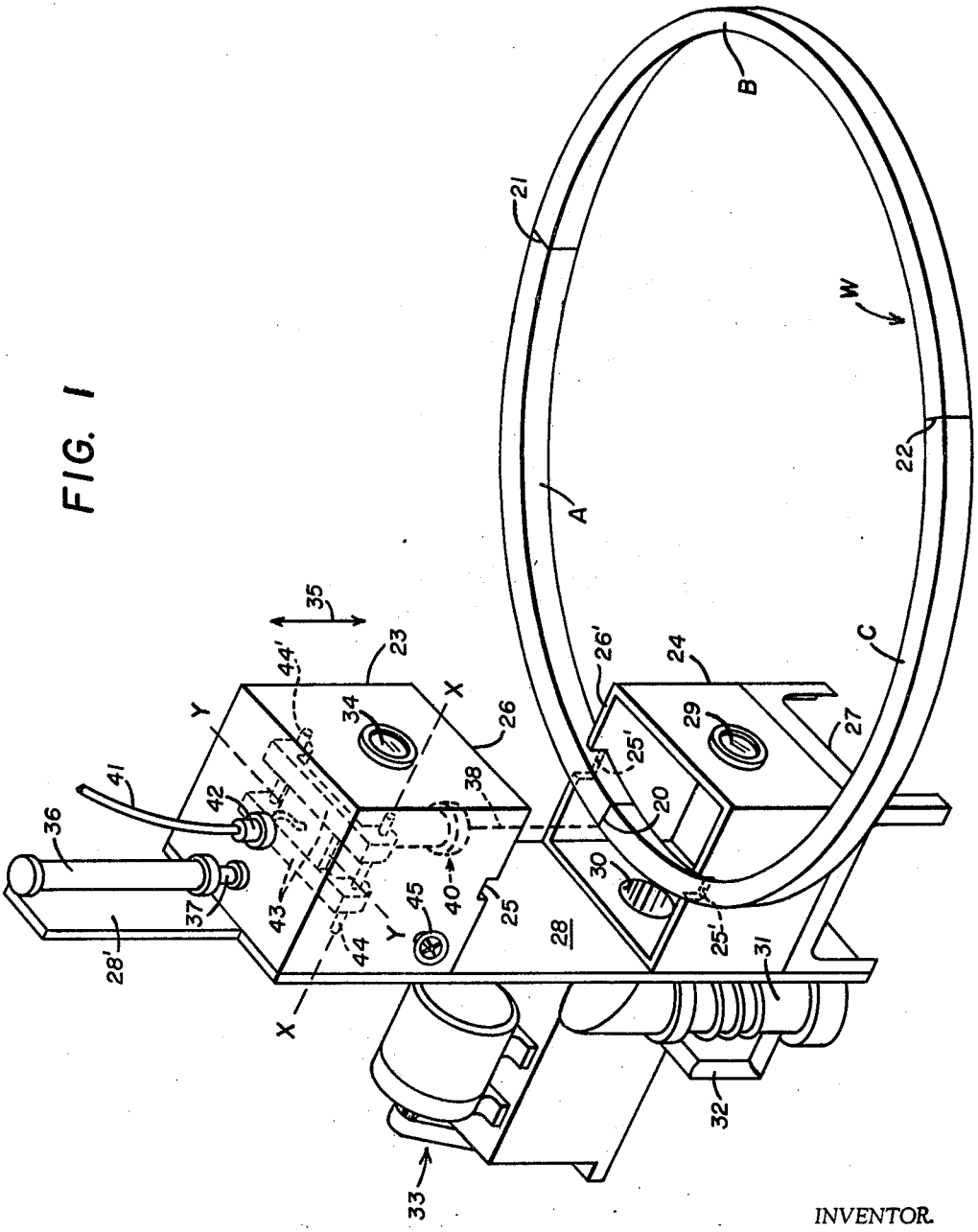
FIG. 1 discloses a split type apply chamber arrangement embodying the principles of the present invention for the electron beam welding together of a plurality of ring segments into an integral ring member.

Referring now to the drawings for a more complete understanding of the invention and first more particularly to FIG. 1 thereof, there is disclosed thereon an arrangement in which the ring segments A, B and C, rectangular in cross section, are electron beam welded at the abutting junctions 20, 21 and 22 to form an integral ring-shaped workpiece W. The welding of each junction, as exemplified by the junction 20, is performed within a separable apply type vacuum chamber comprising upper and lower chambers 23 and 24 which respectively have matching upper and lower peripheral notches 25 and 25'. These notches engage and seal about the ring segments when the sealing surfaces of the chamber peripheries 26 and 26' are moved into engagement. To this end, the sealing surfaces may comprise gaskets or other sealing devices, not shown, which continue into the matching s'ots so that the upper and lower vacuum chambers effectively seal to each other and about the ring segments when the chambers are moved together.

The lower chamber 24 is fixedly supported on a suitable stand 27 having a rear vertically extending mounting panel 28. The front wall of chamber 24 is provided with a viewing port 29, and the rear wall has an opening 30 which communicates with a diffusion pump 31 which connects by the piping 32 with a roughing and backup pumping system generally designated 33.

Upper chamber 23 similarly on the front wall thereof has a viewing port 34, and on the rear wall thereof is slidably mounted by means (not shown) for raising and lowering movement of the upper chamber with respect to the lower chamber, as depicted by the doubleheaded arrow 35. The upstanding portion 28' of panel 28 supports an actuating cylinder 36 whose piston 37 is secured to the chamber 23, the cylinder being connected as a part of a complete hydraulic or pneumatic system (not shown) for operating the cylinder so as to lower or raise the upper chamber, as required.

The path of the electron beam is depicted by the dashed line 38 which is shown in intersecting relation with respect to the junction 20. The electron beam which will move along path 38 to weld the junction is supplied by the electron beam gun generally designated by the numeral 40. Gun 40 is powered from a high voltage cable 41 which passes into upper chamber 23 through suitable insulation provided at 42.

The movements of the electron beam gun 40 to bring the beam into the plane of the junction 20 and to move the beam along the junction are motorized in the Y—Y and X—X axes shown. To this end, electron beam gun 40 is movably mounted on a carriage 43 for movement along the Y—Y axis, and the carriage is slidably mounted, as on the spaced supports 44 and 44' for movement along the X—X axis.

With the parts in the positions as shown in FIG. 1, and assuming that the ring junctions 21 and 22 have already been welded, and that the junction 20 remains to be welded and is positioned, as shown, within the lower chamber 24, the upper chamber 23 is then lowered onto the lower chamber for peripheral engagement therewith. The weight of the upper chamber on the lower chamber alone is usually sufficient to form the initial sealed engagement between the upper and lower chambers. Cylinder 36, however, may be used to supply additional pressure, as desired. The pumping system is then operated to draw a vacuum within the combined chambers 23 and 24 and, as the vacuum develops therewithin, atmospheric pressure on the upper chamber 23 serves further to maintain the two chamber portions in sealed engagement.

The electron beam gun is moved along the X and Y axes to position the gun so that the beam will extend along the path 38 substantially as shown. When the desired operating level of reduced pressure has become established within the combined chambers through the initial action of pump 33 acting as a roughing pump and thereafter by the diffusion pump 31 and pump 33 acting as a backup pump, the welding beam current is turned on and the gun caused to move along the X—X axis to traverse the junction 20, thereby to weld the same. The vacuum is then released by opening valve 45 provided on chamber 23, and the upper chamber 23 raised by actuation of the lift cylinder 36. Ring W is then lifted free of the peripheral notches 25'.

Figure 2:
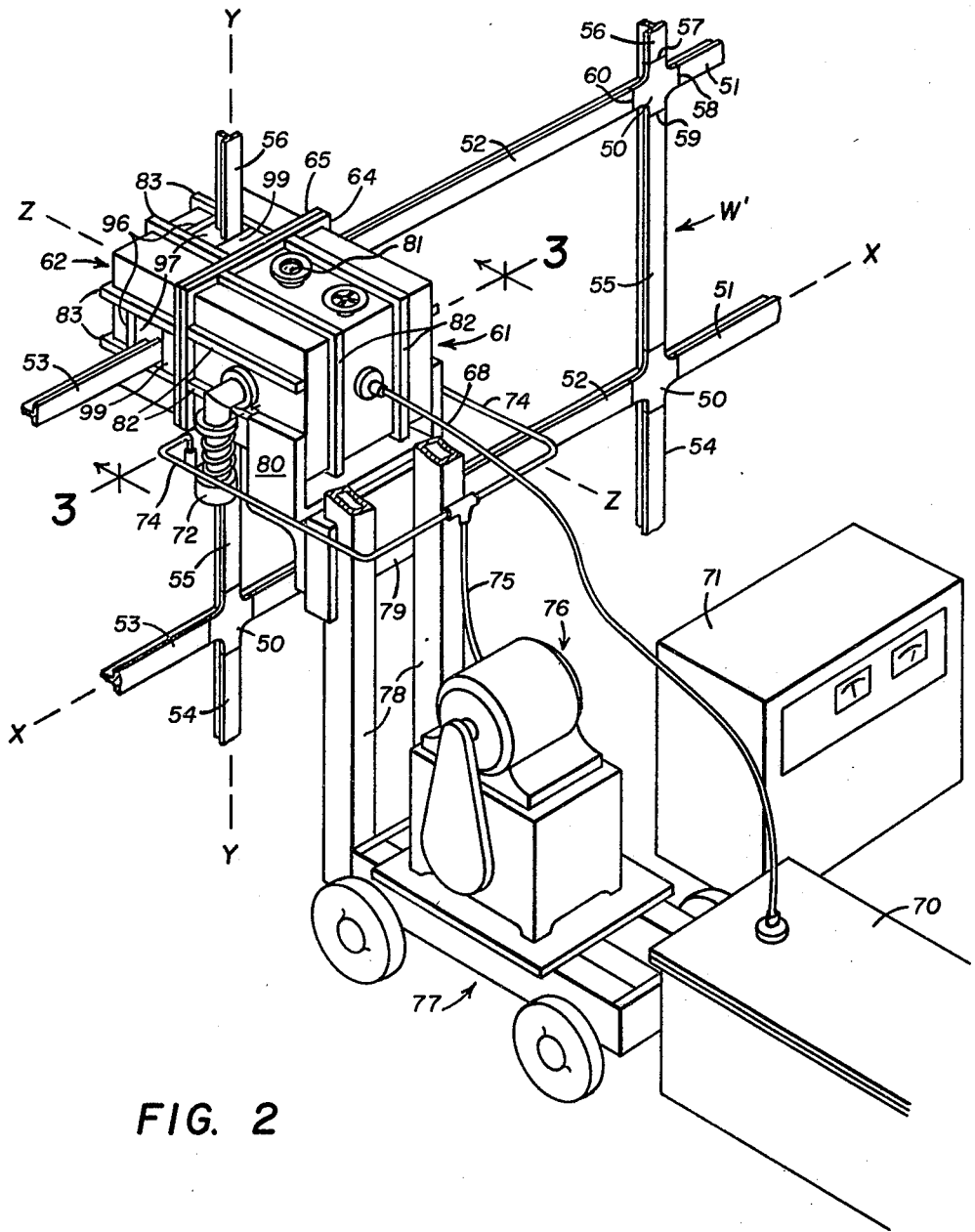
FIG. 2 discloses a split type portable apply chamber arrangement for the electron beam welding of T-section cruciform and extrusion members together at several points in a framework comprising said members.

Referring now to FIG. 2, an arrangement is disclosed for electron beam welding a workpiece W' which is in the form of a framework comprising a plurality of forged cruciform members 50 of T-shaped cross sections to which are welded the horizontally disposed T-section extrusion members 51, 52 and 53 and the vertically disposed T-section extrusion members 54, 55 and 56. There are thus four weld junctions 57–60 at each of the cruciform members 50. The framework W' is vertically disposed, and each cruciform 50 at each of the framework crossover points is separately welded by an electron beam gun mounted within the portable apply type vacuum chamber comprising the front chamber 61 and the rear or back chamber 62. Chambers 61 and 62 have mating flanges 64 and 65 which upon becoming engaged, seal the combined chamber to permit the drawing of a high vacuum therewithin. To this end, the flanges are separated by suitable gaskets 66, or the like sealing devices, see FIGS. 4 and 5.

As will subsequently appear, the back chamber 62 has suitable recesses or openings for receiving the extrusion members 52 ,53, 55 and 56 in sealed engagement therewith. As will also more fully appear as the description proceeds, the front chamber 61 supports the electron beam gun 67, FIGS. 3–5, whose power cable 68 passes outwardly of the chamber 61 through suitable insulation depicted at 69, FIG. 5. Cable 68 at its other end enters a power supply 70, FIG. 2, which has associated therewith the usual electrical instrumentation 71 for controlling operation of the electron beam gun.

Front chamber 61 also has mounted thereon a pair of diffusion pumps 72 and 73 of which pump 72 only appears in FIG. 2. See also FIGS. 3 and 5. These pumps connect to a manifold 74, FIG. 2, which, in turn, connects by flexible line 75 to a roughing and backing pump generally designated 77 having spaced uprights 78 upon which a lift member 79 is slidably mounted for raising and lowering movement by a conventional motor and drive mechanism (not shown). A U-shaped mounting frame 80 is suitably secured to the lift, and the front vacuum chamber 61, in turn, is suitably secured to mounting frame 80.

As more fully described in the copending application of H. M. Rush for Improved Diffusion Pumping System and Method, Ser. No. 631,494, filed Apr. 17, 1967, the efficiency of a diffusion pump system for pumping a chamber in which a high vacuum is desired may be enhanced by employing an array of small diffusion pumps disposed about the periphery of the vacuum chamber, as in the arrangement of pumps 72 and 73 on chamber 61. Use of the small pumps not only increases the efficiency of operation in developing the desired high vacuum and in reducing the time required to attain the same, but the small pumps and associated manifold 74 operating from the flexible line 75 contribute significantly in rendering the chamber portable and maneuverable, as required, to take up the various crossover positions on the cruciform framework W'.

The upper wall of front chamber 61 has a viewing port 81 to aid in alignment of the beam at the cruciform junctions and for observation of the welding operations thereon. Chamber 61 preferably is strengthened by rib members 82 and, similarly, the back chamber 62 has rib members 83.

It will be understood, when desired, that the cruciform workpiece W' may be positioned horizontally and supported at various points by suitable upright members or support devices. Similarly, the back chamber 62, which in such case, would be the lower chamber, would be interfit, as before, to the four extrusion members, and would similarly be mounted so as to support the weight of the superposed chamber 61. In this mode of operation, the chamber 61, which would now be the upper chamber, would be moved into position over the chamber 62 by any suitable lift means such as a block and fall. In this case, as in FIG. 1, gravity acting on the upper chamber 61 would form an adequate initial sealed engagement between the upper and lower chambers to permit operation of the vacuum pumping system to reduce the pressure in the combined chamber.

Figure 4:
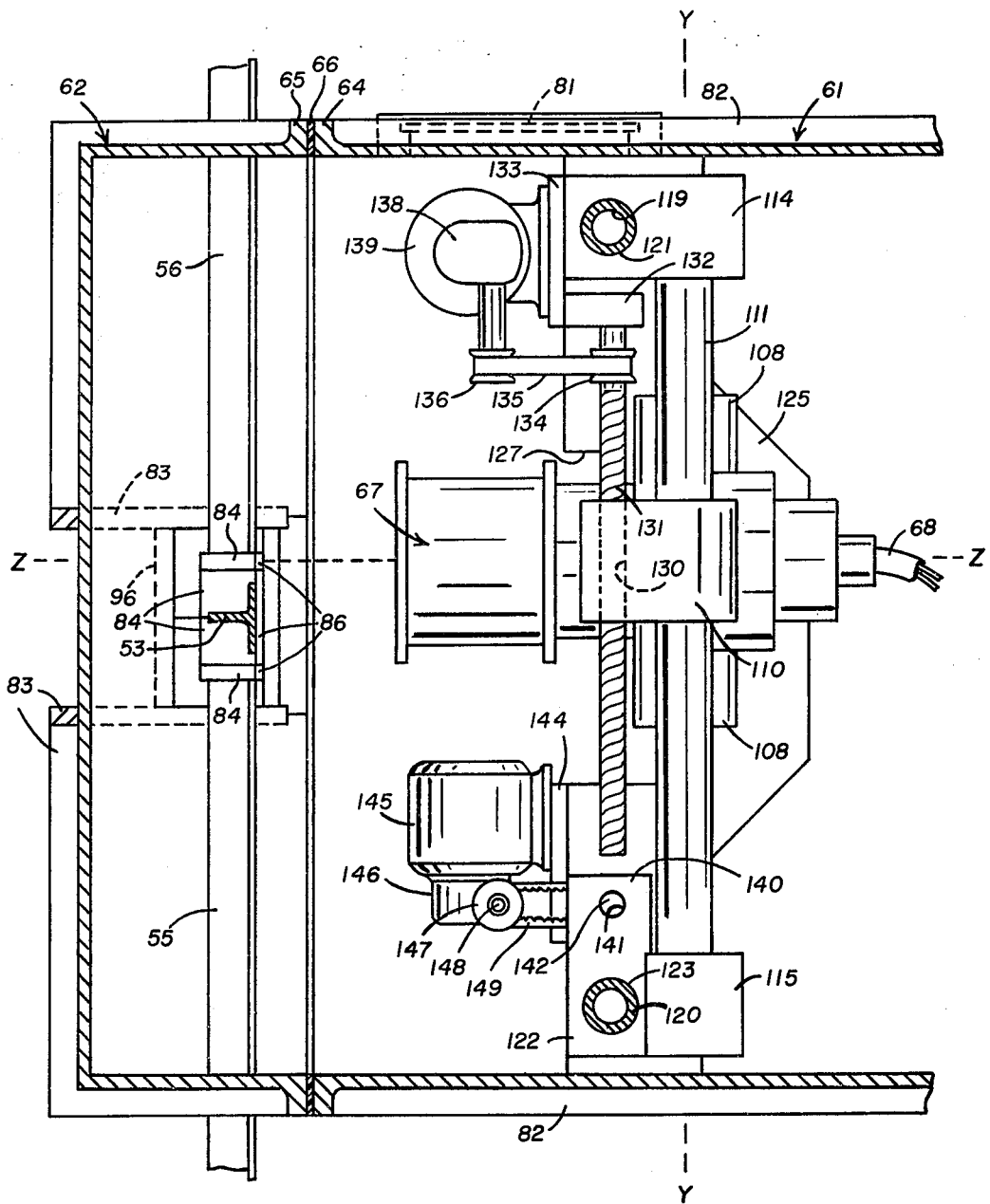
FIG. 4 is a vertical sectional view of the vacuum chamber as viewed along the line 4—4 of FIG. 3.
Figure 5:
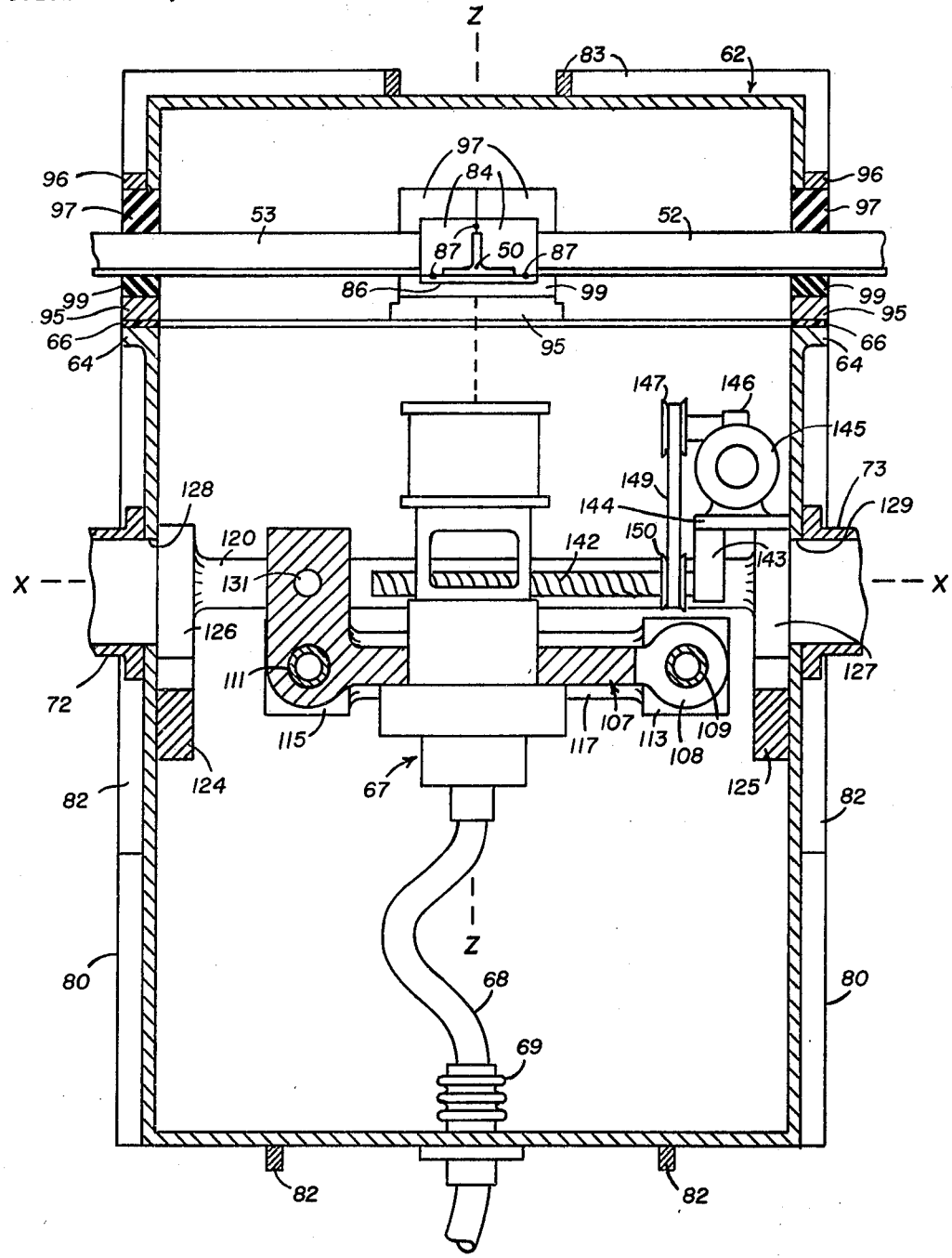
FIG. 5 is a horizontal sectional view taken through the beam axis and viewed substantially along the line 5—5 of FIG. 3, certain parts being shown in elevation for the sake of clarity.
Figure 6:
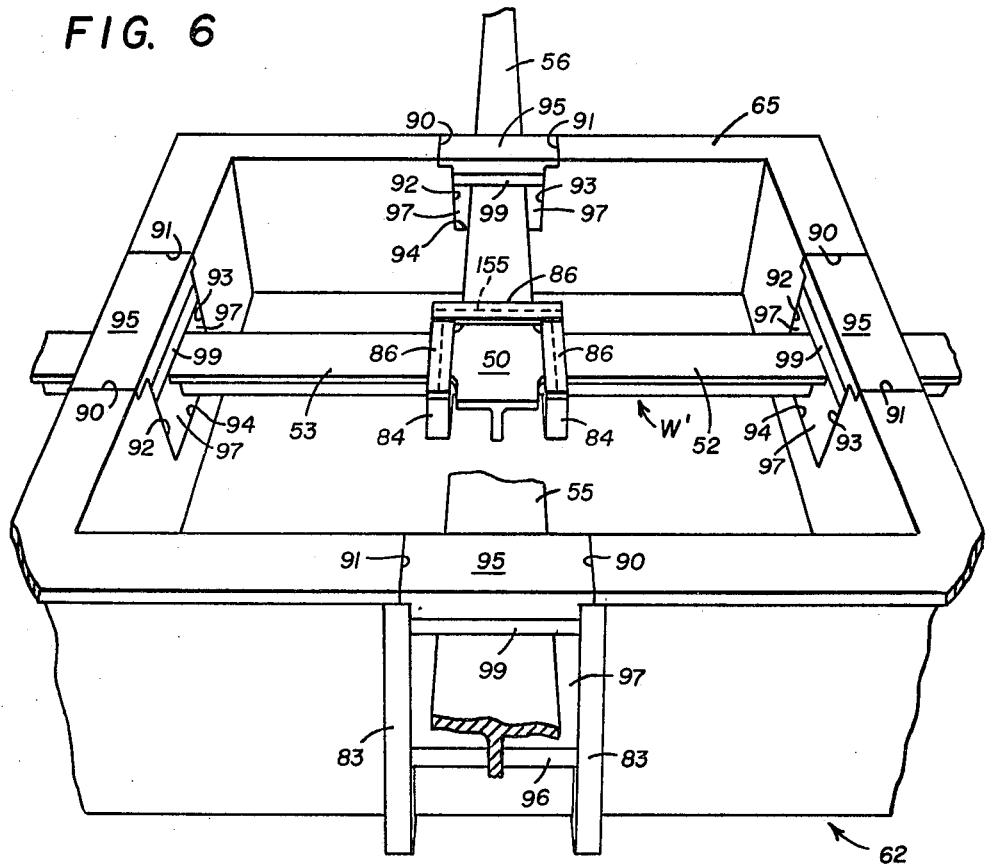
FIG. 6 is a perspective view looking into the back chamber portion of the split chamber of FIG. 2.

Referring now to FIGS. 4 to 6, it will be seen that the workpiece cruciform member 50 to be welded is clamped to each of its abutting T-section extrusion members 52, 53, 55 and 56 by an assemblage of blocks 84 and cap 86 which fit around the abutting T-section members in overlying relation to the junction to be welded, as best seen in FIG. 5. Blocks 84 and cap 86 closely interfit the cross section or profile of the abutting T members to thus fully enclose the same, thereby to present a rectangular cross section of uniform depth to the electron beam for welding whereby the focal length of the beam need be adjusted only once for traverse of the rectangular section. The blocks and cap are joined and held together as by Tig tack welding as at the points 87, FIG. 5. This block concept of electron beam welding of T-section members together is disclosed and claimed in the copending application of H. M. Rush and M. E. Gerard for Method of Beam Alignment and Welding of Non-orthogonal Section Members, Ser. No. 605,728, filed Dec. 29, 1966.

The T-section members 50, 52, 53, 55 and 56 to be welded are disposed entirely within the back chamber 62 and, to this end, see particularly FIG. 6, flange 65 of chamber 62 on each of the four sides thereof has spaced cuts 90 and 91, and each of the four walls of chamber 62 has spaced cuts 92 and 93 which extend rearwardly from the flange 65 to a depth depicted by the numerical 94, the cut surfaces 90, 92, 94, 93 and 91 thus providing a jogged notch or recess in each of the four walls of the chamber 62. As best seen in FIG. 6, the rib members 83 for the back chamber 62 are disposed beneath the flange cuts 90 and 91 and flush with the chamber sidewall cuts 92 and 93. The spaced rib members 83 thus provide interfitting support for the somewhat T-shaped flange inserts 95. A cross piece 96 which extends between the spaced rib members 83 is disposed flush with each sidewall bottom surface 94. Each flange insert 95 and its associated rib members 83 and bottom crosspiece 96 thus together provide a socket for receiving sealing devices designated 97 and 99 which are disposed about each of the extrusion members 52, 53, 55 and 56. These extrusion member sealing devices as discolsed in the arrangement of FIGS. 2 to 6 preferably are formed of a yieldable material such, for example, as rubber, and are shaped generally in the manner of block and cap members 84 and 86, members 97 being shaped similarly to block members 84, and sealing member 99 generally having the shape of cap 86.

Figure 8:
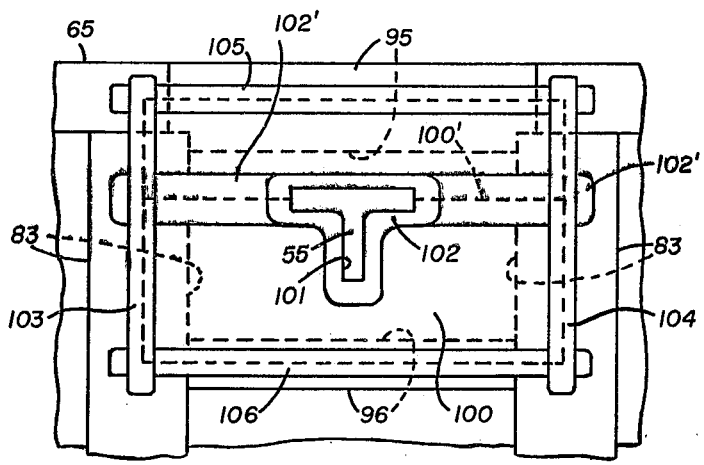
FIG. 8 is a fragmentary view of an elevation of a modified arrangement for sealing the T-section extrusion members within the back chamber of FIG. 2.

A modified sealing arrangement for the extrusion members is disclosed in FIG. 8. In this arrangement, a template plate 100 split along the line 100' and formed of a suitable material such, for example, as aluminum, has a slot 101 through which the extrusion member passes in closely interfitting relationship therewith. Extrusion member 55 is disclosed in this arrangement in order to show comparatively the respective sealing features of this arrangement and that disclosed in FIG. 6. The adjoining surfaces of the template slot 101 and the T-section extrusion member 55 are sealed by a suitable tape material 102 which may be of any form suitable for the purpose such, for example, as zinc chromate tape available commercially under the trade name Kish. This same tape material is employed to seal the template divided edge 100' and to seal the peripheral edge portions of template 100 to the rib members 83, insert 95 and crosspiece 96, as depicted at 102', 103, 104, 105 and 106, respectively. As the vacuum develops within the combined chambers 61 and 62, the resulting atmospheric pressure on the template 100 and the sealed joints established by the tape members 102–106 serves further to establish an effective vacuum tight seal between the associated parts.

Reference is now directed to FIGS. 3–5 and 7 for a a description of the X and Y axis movements which comprise the movable support for electron beam gun 67. As best seen in FIG. 7, electron beam gun 67 is supported directly on a crossfeed support generally designated 107 and having spaced journals 108 disposed for sliding movement along a support tube 109 and a third diametrically oppositely disposed journal block 110 mounted for sliding movement along a support tube 111 which is disposed parallel to tube 109. Tube 109 is secured at the ends thereof to corner blocks 112 and 113, and tube 111 similarly is secured at the ends thereof to corner blocks 114 and 115. Corner blocks 112 and 114 are rigidly secured as by welding to the ends of a tube 116. Similarly, corner blocks 113 and 115 are rigidly secured as by welding to the ends of a tube 117. Tubes 109, 111, 116 and 117 together with corner blocks 112, 113, 114 and 115 comprise a rigid frame, referred to herein as the carriage for gun 67. The gun is movable along the carriage by reason of the sliding support of the crossfeed member 107 on the spaced parallel rods 109 and 111.

The carriage is generally designated 118 and is itself mounted for sliding movement along the spaced rods 119 and 120. To this end, corner blocks 112 and 114 each has a suitable journal 121 for slidably receiving tube 119, and tube 117 has rigidly secured thereto, as by welding, a bearing block 122 having a suitable journal 123 for slidably receiving tube 120. The ends of tubes 119 and 120 at one end thereof are rigidly secured, as by welding, to the ends of a frame 125, see also FIG. 3. The other ends of tubes 119 and 120 are similarly secured to the ends of a frame member 124. Frame members 124 and 125 are suitably secured by means (not shown) to opposite sidewalls of the front vacuum chamber 61, these being the walls to which the diffusion pumps 72 and 73 are respectively secured. Frame members 124 and 125 respectively have cutaway portions 126 and 127, as best seen in FIG. 5, and these openings are disposed opposite the chamber sidewall openings 128 and 129 leading into the diffusion pumps 72 and 73 to thus provide for effective operation of the diffusion pumps.

Referring again to FIG. 7, journal block 110 has a threaded opening 130 which threadedly receives a feed screw 131 having an end bearing support 132 which is supported on a plate 133, in turn, secured to corner block 114. Feed screw 131 has a pulley 134 having a belt driving connection 135 with a pulley 136 secured to the output shaft 137 of a worm gear reduction generally designated 138 which is driven by a motor 139 also supported by bracket 133. Operation of motor 139 in either direction thus causes rotation of the feed screw 131 to thus move the gun crossfeed support 107 in either direction along the Y—Y axis which extends in the direction of the spaced tubes 109 and 111, feed screw 131 also being parallel to the Y—Y axis.

Figure 3:
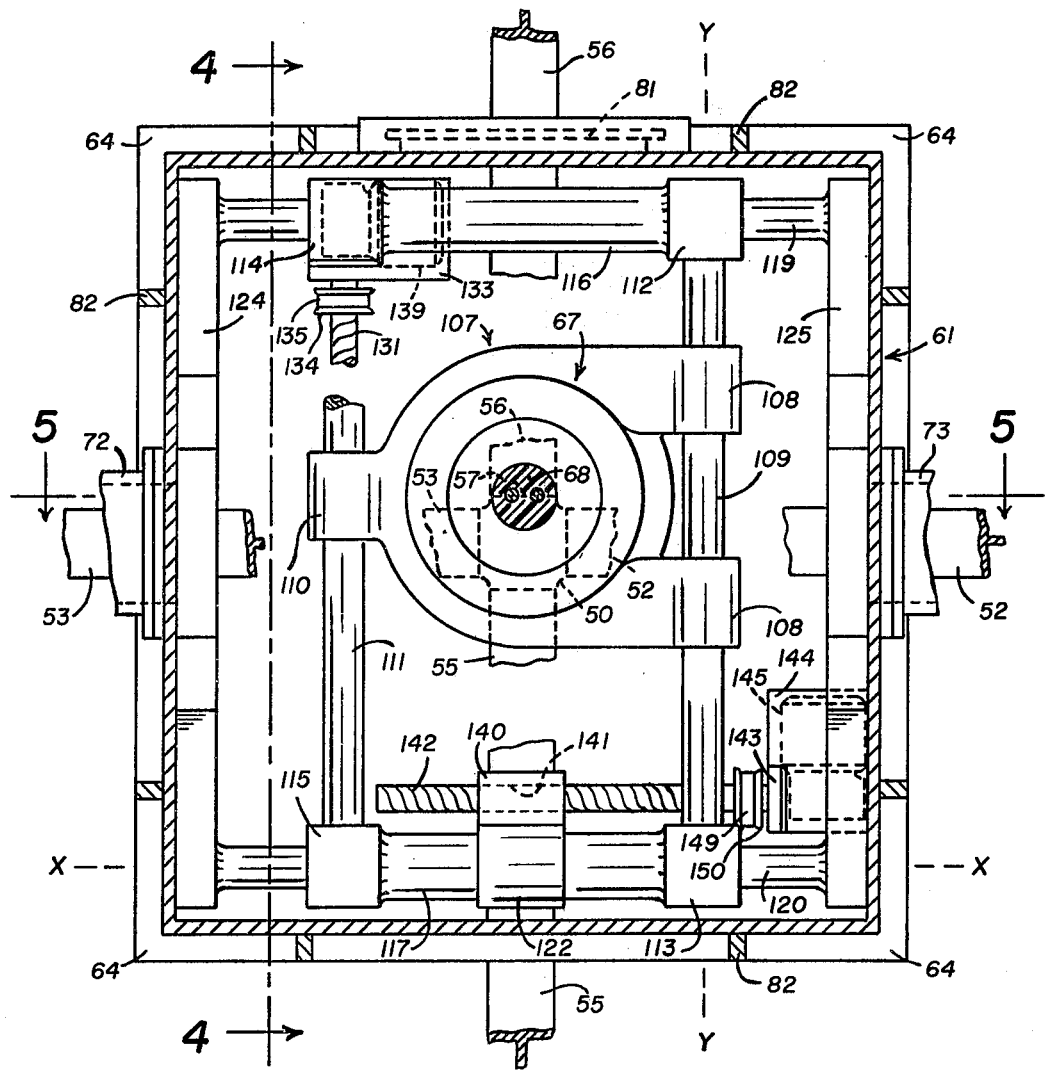
FIG. 3 is a sectional view of the vacuum chamber of FIG. 2 taken in a vertical plane inwardly of the front wall of the chamber as viewed in the direction of arrows 3—3 of FIG. 2.

As best seen in FIG. 3, journal block 122 has a lateral portion 140 having a threaded opening 141, see also FIGS. 4 and 7, for threadedly receiving a feed screw 142. An end bearing support 143, see FIGS. 3 and 5, for feed screw 142 is secured to a plate support 144 for motor 145, plate 144, in turn, being suitably secured to frame 125. Motor 145 operates through a worm gear reduction 146 to drive a pulley 147 carried on its output shaft 148, as best appears in FIGS. 4 and 7. Pulley 147 drives a belt 149 which, in turn, drives pulley 150 secured to feed screw 142, as best appears in FIGS. 3 and 5. Thus, operation of motor 145 in opposite directions turns feed screw 142 in opposite directions to thus move carriage 118 in opposite directions along the X—X axis which extends parallel to the support tubes 119 and 120.

It will be understood that electron beam gun 67, in actual practice, may have gimbal and other supports on the crossfeed 107 for aligning the beam relative to the Z axis, or for adjusting the gun along the Z axis. It will be understood, moreover, that the X axis frame members 124 and 125 may be adjustably secured to the movable chamber 61 so that either or both of the X and Y axes of the gun movements may be angularly shifted somewhat, as desired, or required.

In the operation of the apply apparatus of FIG. 2, blocks 84 and cap 82 are assembled and secured around each of the cruciform joints to be welded, after which, back chamber 62, together with its inserts 95 and seals 97 and 99, or split template 100, as the case may be, are assembled around the extrusion members of the workpiece, as disclosed in FIGS. 6 and 8. The front chamber 61 is then transported by the wheeled truck 97 and its lift 79 and moved thereby into sealing peripheral engagement with back chamber 62. The vacuum in the combined chamber is next drawn through operation of the roughing and backing pump 76 in association with diffusion pumps 72 and 73. When the pressure has been reduced to the desired level, the X and Y axis motors 145 and 139 are operated singly or collectively to position and align the beam with a particular joint in the cruciform 50, such as joint 57 depicted by the dashed lines in FIG. 3. The gun would then be moved along the X axis to position the beam at one edge of the joint.

The beam would first be traversed along a scribed line 155 provided on cap 86, FIG. 6, this traverse being at low beam current density sufficient only to illuminate the scribed line and insufficient to burn the metal. This tracer beam method of assuring that the beam will traverse the desired path along the scribed line which, in turn, is made to identify and locate the joint to be welded, is disclosed and claimed in the copending application of R. W. Kitchin for Tracer Beam Method for Electron Beam Welder, Ser. No. 653,117, filed July 13, 1967.

When the tracer beam operations have assured that the beam will traverse the scribed line, full beam welding current is turned on for the retraverse of the beam, thereby to complete the weld at the joint. When the other joints 58–60 similarly have been welded, the vacuum is released by opening release valve 156 provided on front chamber 61. Chamber 61 is then removed, and back chamber 62 is stripped away and re-assembled, as before, in another cruciform welding zone.

From the foregoing, it should now be apparent that an apply type of welding apparatus has been provided which is well adapted to fulfill the aforestated objects of the invention, and while only a few examples of the invention have been disclosed, it will be apparent that the same may be embodied in other forms or carried out in other ways without departing from the spirit or essential characteristics thereof. The present embodiment of the invention is therefore to be considered in all respects as illustrative and not restrictive, the scope of the invention being indicated by the appended claims, and all changes coming within the meaning and range of equivalency of the claims are intended to be embraced therein.

Having thus described the invention, what is claimed as new and useful and desired to be secured by Letters Patent is:

1. Apply type electron beam welding apparatus for separately welding discrete joints in a large workpiece having widely separated welding zones with at least one joint to be welded in each zone comprising, in combination, a split vacuum chamber having means for engaging the workpiece in vacuum sealing relation therewith and having separable chambers relatively movable together about the workpiece to form a combined vacuum chamber enclosing one of the welding zones thereof, an electron beam gun carried within said separable chambers and having means for moving its beam in a welding traverse along a joint in the workpiece disposed within the enclosed welding zone, and means for drawing a high vacuum in said combined chamber including at least one diffusion pump connected to said separable chambers, wherein one of said separable chambers is mounted and positioned on the workpiece in said one of the zones thereof and has peripheral notches for receiving portions of the workpiece in sealed engagement therewith, and the other of the separable chambers is transportable into peripheral sealed engagement with said one of the chambers, and wherein said vacuum drawing means comprises a plurality of diffusion pumps carried in peripherally spaced relations by and separately connected into said other of the separable vacuum chambers, a roughing and backing pump disposed in fixed position, a manifold connecting said diffusion pumps, and carried thereby and a flexible line connecting said manifold and said roughing and backing pump.

2. Apply type electron beam welding apparatus as in claim 1 wherein the mount for said gun comprises a carriage slidably supported on said movable chamber and movable with respect thereto to direct the beam along an X—X axis, a crossfeed slidably supporting the gun on said carriage to direct the beam along a Y—Y axis, and a viewing port in at least one of said separable chambers for viewing the alignment and welding traverse of the beam relative to the joint in the workpiece being welded.

3. Apply type electron beam welding apparatus for separately welding discrete joints in a large workpiece having widely separated welding zones with at least one joint to be welded in each zone comprising, in combination, a split vacuum chamber having means for engaging the workpiece in vacuum sealing relation therewith and having separable chambers relatively movable together about the workpiece to form a combined vacuum chamber enclosing one of the welding zones thereof, an electron beam gun carried within said separable chambers and having means for moving its beam in a welding traverse along a joint in the workpiece disposed within the enclosed welding zone, and means for drawing a high vacuum in said combined chamber including at least one diffusion pump connected to said separable chambers, and wherein one of said separable chambers is mounted and positioned on the workpiece in said one of the zones thereof and has peripheral notches for receiving portions of the workpiece in sealed engagement therewith, and the other of the separable chambers is transportable into peripheral sealed engagement with said one of the chambers, and wherein said transportable chamber has a supporting wheeled truck, and a lift on the truck having said transportable chamber secured thereto.

4. Apply type electron beam welding apparatus as in claim 3 and wherein said workpiece is in the form of a vertically disposed framework having a plurality of T-section cruciform members disposed respectively in said welding zones and having T-section extrusion members welded thereto, said one of the chambers is a back chamber which repeatedly is mounted on the framework so as to dispose the same successively in enclosing relation to the cruciform sections and their adjoining extrusion member portions, and said other of the separable chambers is a front chamber transportable by said truck and lift into sealing engagement with said back chamber.

References Cited

UNITED STATES PATENTS

| | | | |
|---|---|---|---|
| 3,110,793 | 11/1963 | Worthington | 219—85 X |
| 3,136,882 | 6/1964 | Radtke. | |
| 3,136,883 | 6/1964 | Radtke. | |
| 3,264,004 | 8/1966 | Sciaky | 219—72 X |
| 3,301,993 | 1/1967 | Boyd et al. | |
| 3,369,101 | 2/1968 | Di Curcio. | |
| 3,156,810 | 11/1964 | Samuelson | 219—121 |
| 3,401,249 | 9/1968 | Schleich et al. | 219—69 |
| 3,426,173 | 2/1969 | Steigerwald | 219—121 |

W. DEXTER BROOKS, Assistant Examiner

JOSEPH V. TRUHE, Primary Examiner